United States Patent Office 3,086,866
Patented Apr. 23, 1963

3,086,866
COAGULATION OF MILK
Thomas W. Humphreys, Plainfield, and Dudley S. Titus, Westfield, N.J., assignors to Merck & Co., Inc., Rahway, N.J., a corporation of New Jersey
No Drawing. Filed Mar. 3, 1960, Ser. No. 12,519
1 Claim. (Cl. 99—59)

This invention relates to an improved method for the coagulation of milk. More particularly, it is concerned with a process for the coagulation of milk by the action of *Pediococcus cerevisiae*.

The process of bringing about the coagulation of milk by the addition of lactic acid-producing bacterium is well known in the art.

It is an object of the present invention to provide an improved means for effecting the coagulation of milk. Another object is to shorten the time required for the coagulation of milk. A further object is to provide a method which eliminates the time consumed in preparing large volumes of inoculum by subculture techniques heretofore used in coagulating milk. An additional object is to eliminate the interference by bacteriaphage frequently encountered with the presently used microorganisms used for the coagulation of milk. These and other objects of this invention will be readily apparent from the detailed description of this invention hereinafter provided.

In accordance with the present invention, it is now found that the time required for the coagulation of milk can be shortened considerably by including in the milk *Pediococcus cerevisiae* together with suitable sources of carbon and nitrogen for the microorganism. Sources of carbon that are suitable for this purpose are carbohydrates which are assimilable by said microorganism. Thus, sugars such as dextrose, fructose, sucrose, mannose, galactose and maltose are satisfactory sources of carbon for *Pediococcus cerevisiae*. Pursuant to a preferred embodiment of the present invention, dextrose is preferably used since this sugar is inexpensive and readily available. If desired, the sugars can be added to the milk in the form of solutions thereof such as corn syrup and the like.

Alternatively, and in accordance with a further embodiment of the present invention, the milk itself can be used as a source of carbon for the *Pediococcus cerevisiae* by adding a suitable enzyme capable of converting the lactose of the milk to dextrose and galactose. Thus, lactase can be added to the milk for this purpose.

Among the various sources of nitrogen which can be used in carrying out the processes of the present invention that might be mentioned are suitable sources of protein, amino acids and the like. Thus, yeast products such as yeast extract, yeast autolysate, solubilized yeast, food yeast and the like and amino acids such as hydrolyzed proteins, for example, enzymatic digest of casein, and proteins such as peptone and the like are suitable for use in the present invention.

The amount of the source of carbon used in the process of the present invention is not critical, but in general, it is preferred to use an amount not in excess of about 2% by weight of the milk. When dextrose is employed as the source of carbon, it is preferred to use it in an amount between about 0.5 and 2.0%. Usually, about 1% of dextrose is sufficient and gives good results in the improved process of the present invention. The quantity of the source of nitrogen used is likewise not critical and can vary depending in part upon the particular source being utilized. In general, it is preferred to use an amount of the source of nitrogen equivalent to about 0.5% to about 2.0% by weight of the milk.

In accordance with a further embodiment of the present invention, it is found that the coagulation of the milk can be accelerated further by including in the milk, in addition to the sources of carbon and nitrogen, a small amount of a purine such as guanine, adenine, xanthine and the like. In general, it is found that an amount of purine of about 0.5 to 2 mg. per 100 ml. of milk or more will accelerate the formation of lactic acid and therefore, the coagulation of the milk. Usually, it is found that when the milk is supplemented with sources of carbon and nitrogen and a small amount of purine an incubation period of from about 16–24 hours at about 37° C. will bring about complete coagulation of the milk. These purines are present in various yeast products, and hence when such materials are used as the source of assimilable nitrogen, it is not necessary to add additional purines.

In carrying out the processes of the present invention for the coagulation of milk, the formation of the lactic acid can be allowed to continue until complete coagulation occurs or the coagulation can be effected earlier when a particular desired level of titratable acidity is reached be the addition of rennet extract in accordance with procedures well known in this art.

The following examples which are presented to illustrate the processes of the present invention were carried out in general as follows:

The milk samples employed in the examples were prepared by reconstituting commercial non-fat dry milk solids using 10 g. of the milk solids in 90 ml. of distilled water. The milk was dispensed in 10 ml. quantities in cotton-plugged pyrex test tubes, sterilized by autoclaving at 250° F. for 10 minutes, cooled quickly by immersion in tap water, inoculated with the *Pediococcus cerevisiae* cells and incubated at 37° C. for 20–24 hours. At the end of the incubation period, the relative amount of lactic acid formed was determined by titrating the incubated tubes directly with N/10 sodium hydroxide to the phenolphthalein end point. The nutrient source of carbon employed in all of the examples unless otherwise indicated was 1% by weight of dextrose. The dextrose and the nutrient source of nitrogen, which is indicated in the examples as the additive, were added either from stock solutions or as solids and the pH of the milk was brought to 6.6–6.8 by the addition of sodium hydroxide or hydrochloric acid before adjusting the final volume.

The non-fat dry milk solids employed in these examples were utilized as a convenience since it avoided any variation which might occur in natural milk. However, it is understood that in commercial practice of this invention whole or skimmed milk either alone or enriched with non-fat dry milk solids would normally be used. The inoculum of *Pediococcus cerevisiae* was prepared by growing this microorganism at 37° C. for 20–24 hours in the following medium.

A two liter solution of the following composition was formed:

| | | |
|---|---|---|
| Tryptone | grams | 20 |
| Yeast extract | do | 10 |
| Sodium citrate | do | 10 |
| $K_2HPO_4$ | do | 10 |
| Dextrose (anhydrous) | do | 20 |
| Tween 80 | ml | 2 |
| $NaNO_2$ | grams | 0.2 |
| Salt solution | ml | 1,000 |
| Distilled water, q.s. | ml | 2,000 |

The salt solution employed was of the following composition:

| | | |
|---|---|---|
| $MnCl_2.4H_2O$ | grams | 1.4 |
| $FeSo_4.7H_2O$ | do | .4 |
| $MgSO_4.7H_2O$ | do | 8.0 |
| Distilled water | ml | 1,000 |

After preparing the above-described medium, the pH was adjusted electrometrically to 7.12 with concentrated hydrochloric acid and 50 g. of sodium chloride were dissolved in the medium. The pH was then 6.8. Prior to inoculation with the microorganism, the medium was sterilized by autoclaving at 120° C. for 30 minutes.

The broth culture at the time of use contained about $10^8$–$10^9$ cells per ml. and 0.1 ml. of this broth culture was used to inoculate the 10 ml. milk samples.

In these examples the nutrient source of nitrogen and the source of the purine and the amounts thereof are indicated as additives to the dextrose-containing milk.

*Example 1*

In this example different enzymatic digests of casein obtainable commercially and known under the trade name N-Z-amines were tested to determine their suitability as sources of nitrogen for the *Pediococcus cerevisiae*. These N-Z amine preparations were added in the amount of 0.5% by weight and the results compared with a test with 0.5% by weight of yeast extract. In this test the milk samples were incubated for 20 hours at 37° C. The results were as follows:

| Additive | Ml. N/10 NaOH/10 ml. of sample | | |
|---|---|---|---|
| | Inoculated | Control | Difference |
| NZ-amine type A | 6.10 | 3.50 | 2.60 |
| NZ-amine type AS | 6.60 | 4.00 | 2.60 |
| NZ-amine type B | 5.00 | 3.60 | 1.40 |
| NZ-amine type E | 4.60 | 3.50 | 1.10 |
| NZ-amine type YT | 5.40 | 3.50 | 1.90 |
| Yeast extract | 7.65 | 3.40 | 4.25 |
| None (control) | 2.95 | 2.60 | 0.35 |

*Example 2*

The ability of 0.5% yeast autolysate, solubilized yeast, and food yeast natural, respectively to support acid production of *P. cerevisiae* in milk containing 1% dextrose was compared with 0.5% yeast extract alone and with manganese added ($MnCl_2$: 0.0003 gm./ml. of milk). The table shows that these various yeast products were suitable sources of nitrogen for the microorganism. These results are as follows:

Incubation was 20–21 hours at 37° C.

| Form of yeast | Ml. N/10 NaOH/10 ml. of sample | | |
|---|---|---|---|
| | Inoculated | Control | Difference |
| Autolysate | 9.55 | 3.20 | 6.35 |
| Solubilized | 6.90 | 2.90 | 4.00 |
| Food | 4.00 | 2.40 | 1.60 |
| Extract | 7.50 | 3.20 | 4.30 |
| Extract plus $MnCl_2$ | 7.35 | 3.30 | 4.05 |
| Control | 3.20 | 2.30 | 0.90 |

*Example 3*

These tests were made to determine the effectiveness of various groups of amino acids on the development of *Pediococcus cerevisiae* in milk. In Test A all of the amino acids and guanine were added, but in Tests B–G the amino acids indicated were deleted. In the tabulated results of Tests B–G, the nature and the number of amino acids deleted are indicated.

A. DL-valine, 160 mg.; L-leucine, 50 mg.; DL-isoleucine, 100 mg.; L-hydroxyproline, 5 mg.; DL-phenylalanine, 100 mg.; L-tyrosine, 35 mg.; L-cystine, 5.0 mg.; L-arginine, HCl, 40 mg.; L-histidine, HCl, 20 mg.; L-lysine, 100 mg.; DL-methionine, 80 mg.; DL-threonine, 60 mg.; DL-serine, 20 mg.; L-glutamic acid, 125 mg.; DL-aspartic acid, 50 mg.; glycine, 5 mg.; DL-alanine, 40 mg.; L-proline, 5 mg.; L-cysteine, HCl 10, DL-tryptophane 10, and guanine 2 mg. per 100 ml. of milk.

B. DL-valine, L-leucine, DL-isoleucine, DL-threonine, DL-serine, glycine, DL-alanine.

C. DL-methionine, L-cystine, L-cysteine HCl.

D. L-aspartic acid, L-glutamic acid.

E. L-histidine, DL-tryptophane, L-proline, hydroxy-L-proline.

F. L-arginine, L-lysine.

G. L-tyrosine, DL-phenylalanine.

H. No amino acids added and no guanine added.

The incubation was 16 hours at 37° C.

| Deletion | Ml. N/10 NaOH/10 ml. of sample | | |
|---|---|---|---|
| | Inoculated | Control | Difference |
| A. None (all 20 acids added) (control) | 10.73 | 4.24 | 6.49 |
| B. Monoamino monocarboxylic acids (7) | 7.40 | 3.86 | 3.54 |
| C. S-containing acids (3) | 6.00 | 4.46 | 1.54 |
| D. Monoamino dicarboxylic acids | 6.60 | 4.34 | 2.26 |
| E. Heterocyclic acids (4) | 7.00 | 4.46 | 2.54 |
| F. Diamino monocarboxylic acids (2) | 6.10 | 4.24 | 1.86 |
| G. Aromatic acids (2) | 7.25 | 4.16 | 3.09 |
| H. All (no acids added and no guanine) (control) | 3.57 | 2.60 | 0.97 |

*Example 4*

The effect of the combinations of amino acids, proteins and purines indicated in the table below on the development of *Pediococcus cerevisiae* in milk was determined. Amounts of constituents are expressed as weight/100 ml. of milk. The incubation was 24 hours at 37° C.

| Additive | Ml. N/10 NaOH/10 ml. of sample | | |
|---|---|---|---|
| | Inoculated | Control | Difference |
| A. Casamino acids, 1.0 gm; L-cysteine HCl, 10 mg; DL-tryptophane, 10 mg; 1 mg. each of adenine, guanine, cytosine, uracil and thymine; and 8 B vitamins (riboflavin, niacin, thiamin hydrochloride, calcium pantothenate, paraaminobenzoic acid and pyridoxine hydrochloride being added at the level of $50\gamma$ per ml. of milk, and folic acid and biotin at the level of $1\gamma$ per ml. of milk.) | 10.90 | 3.97 | 6.93 |
| B. As in A except purines and pyrimidines omitted | 5.25 | 3.50 | 1.75 |
| C. As in A except amino acids omitted | 3.56 | 2.60 | 0.96 |
| G. Peptone, 0.5 gm | 9.01 | 3.35 | 5.66 |
| H. Tryptone, 0.5 gm | 6.89 | 3.72 | 3.17 |
| I. Yeast extract, 0.5 gm | 11.33 | 3.88 | 7.45 |
| J. Control, no additive | 3.09 | 2.60 | 0.49 |

*Example 5*

The effect of purines and pyrimidines on the development of *Pediococcus cerevisiae* was determined. Milk containing per 100 ml.; Casamino acids (Difco), 1.0 gm.; L-cysteine HCl, 10 mgm.; and DL-tryptophane, 10 mgm., was further supplemented as indicated in the table with purine and/or pyrimidine. The amount of each purine and each pyrimidine employed was 1 mgm./ 100 ml. of milk. The incubation was 18 hours at 37° C.

| Additive | Ml. N/10 NaOH/10 ml. of sample | | |
|---|---|---|---|
| | Inoculated | Control | Difference |
| A. Cytosine, uracil and thymine | 5.64 | 4.00 | 1.64 |
| B. Adenine and guanine | 10.39 | 4.00 | 6.39 |
| C. Adenine, guanine, cytosine uracil and thymine | 10.18 | 3.85 | 6.33 |
| D. Like C minus cysteine and tryptophane | 6.94 | 3.85 | 3.09 |
| E. Adenine only | 6.49 | 3.83 | 2.66 |
| F. Guanine only | 8.70 | 4.05 | 3.65 |
| G. Cytosine only | 5.32 | 4.00 | 1.32 |
| H. Uracil only | 5.47 | 4.10 | 1.37 |
| I. Thymine only | 5.19 | 3.72 | 1.47 |
| J. Control milk (no amino acids, pyrimidines or purines added) | 3.46 | 2.74 | 0.72 |

*Example 6*

In this example, lactase was included in the milk and the dextrose was not. The stimulating agent employed was yeast autolysate and the amount used was 0.5 wt. percent.

A commercial form of purified lactase was used in these tests. It was dissolved in water and sterilized by passage through a membrane filter; subsequently, twofold serial dilutions were made in milk. In the work with lactase, there were certain modifications of procedures employed in the previous examples, as follows: (a) modified inoculum: 75 mgm. of *P. cerevisiae* cells (cells lyophilized with non-fat dry milk solids—no dextrose added) were diluted to 25 ml. with distilled water and used at the rate of 0.1 ml. per 5 ml. of milk sample. (b) Titrations were not carried out. Instead, tubes were observed for coagulation of the milk.

The table shows that coagulation of the milk occurs at an enzyme level as low as 0.0625 mgm./ml. (app. .006%) at 37° C. The level of enzyme required for coagulation will vary with its activity. In general, the lactase used herein will yield 70–80% of the monoses of lactose with an initial substrate concentration of 10–15%, an incubation temperature of 40° C., and an incubation time of four hours at pH 6–7. The $E/S$ ratio is 1/40.

| Concentration of lactase (mgm./ml.) | Coagulation + or − in— | | | | | |
|---|---|---|---|---|---|---|
| | 16 hours, inoculated | 37° C., control | 24 hours, inoculated | 37° C., control | 48 hours, inoculated | 37° C., control |
| 1.0 | + | − | + | − | + | − |
| 0.5 | + | − | + | − | + | − |
| 0.25 | + | − | + | − | + | − |
| 0.125 | + | − | + | − | + | − |
| 0.0625 | + | − | + | − | + | − |
| 0.0313 | − | − | − | − | [1] + | − |
| 0.0157 | − | − | − | − | − | − |

[1] Very soft coagulum.

NOTE.—+ equals solid coagulum. − equals no evidence of coagulation.

Various changes and modifications of the invention can be made and, to the extent that such variations incorporate the spirit of this invention, they are intended to be included within the scope of the appended claim.

What is claimed is:

In the process of coagulating milk the improvement which comprises adding lactase in an amount sufficient to convert the lactose of the milk to dextrose and a source of nitrogen in an amount between about 0.5% and 2% by weight to milk and incubating said milk with *Pediococcus cerevisiae* until substantial amounts of lactic acid are produced.

References Cited in the file of this patent

UNITED STATES PATENTS 2,681,858    Stimpson _____ June 22, 1954

OTHER REFERENCES

Dacre: Journal of Dairy Research, October 1958, vol. 25, No. 3, pp. 409–417.

"Bergey's Manual of Determinative Bacteriology," published by Williams and Wilkins Co., Baltimore, Md., 1957, pp. 530–531.

"The Genus Pediococcus," by Pederson, C. S., 1949, Bact. Rev., vol. 13, pp. 228–229.

"Milk and Milk Processing," by Herrington, B. L., 1948, published by McGraw-Hill, pp. 21, 82, 90, 116.